3,686,105
PROCESS FOR PREPARING AMINO ALDEHYDE
MOLDING COMPOSITIONS
Edwin M. Culkowski, Toledo, Donald B. Gore, Swanton, and Andrew W. Kassay, Toledo, Ohio, assignors to Allied Chemical Corporation, New York, N.Y.
No Drawing. Filed Dec. 29, 1969, Ser. No. 888,892
Int. Cl. C08g 51/18
U.S. Cl. 260—17.3
21 Claims

ABSTRACT OF THE DISCLOSURE

Amino aldehyde molding compositions are prepared by impregnating a filler with the liquid amino aldehyde resin and pigments; the resultant pigmented resin is dried and cut into popcorn which is fed to a continuous mill along with lubricants, catalysts and stabilizers to prepare the molding composition which is compacted and granulated. This process eliminates the requirement of batch ball milling, improves the economy of preparing molding composition of amino aldehyde resins and improves the gassing characteristics of the compositions during molding.

This invention relates to amino aldehyde molding compositions. More particularly, this invention relates to a process for the production of filled amino aldehyde molding compositions which eliminates the need of batch ball milling.

BACKGROUND OF THE INVENTION

Amino aldehyde resins have attained wide commercial acceptance, particularly for decorative molded articles, such as dinnerware, home appliances, telephones and the like where uniform appearance is a prime requisite. Uniformity of color and surface appearance is due in large manner to the method of forming these resins and thus uniform dispersion of pigments and additives in the resin is an absolute requirement.

The method used in commercial practice to prepare these resins is to first form a syrup of the amino aldehyde condensate in solution, thereafter impregnating a suitable filler with the resin and drying the product to form a friable solid. This is cut to a medium size about the size of corn kernels which has come to be known in the art as popcorn. To this popcorn is now added various ingredients required to prepare a high grade molding compound, particularly the desired pigments, opacifiers, stabilizer, catalyst and mold lubricants. In order to form the required uniform dispersion of these ingredients, the popcorn and additives are next ground in a ball mill. The ball milled product, which is a fine powder, is then usually densified and granulated in form suitable for molding.

The ball mill is a rotatable apparatus filled to a depth of from ½ to ⅔ with small balls of stone or porcelain. Upon addition of the resin-additive charge, the mill is closed and rotated, setting the balls in motion. They travel up the walls of the mill as it turns, finally falling down by force of gravity onto the particles to be ground. Part of the charge is trapped between the balls and thus during rotation the mill also imparts a unique blending operation as well as grinding operation. Thus, batch ball milling has been considered essential to obtain pigmented amino aldehyde molding compositions having commercially acceptable uniformity of appearance when molded.

Although the ball mill produces a product which is both finely ground and uniform in constitution, ball milling is essentially a batch type operation. Residence times in the ball mill required to grind popcorn to a fine powder and uniformly blend the required pigments and additives vary from about one and one-half to four hours. Further, since there are practical limitations on the size of ball mills, a series of ball mills are required to utilize the quantity of popcorn produced by the preceding steps in any commercial operation. Thus, ball milling, while efficient, constitutes a major expense in time and capital investment in the preparation of amino aldehyde resins, and a process whereby batch ball milling of the popcorn is eliminated in favor of a continuous milling operation without a concomitant decrease in uniformity of dispersion of pigments and additives has long been desired by the industry.

Various methods have been proposed to avoid the ball milling step. Substitution of different types of mills which can adequately grind the popcorn to the desired particle size do not at the same time adequately disperse the pigments and other additives so that uniform molded articles can be obtained and additional blending equipment has been required, adding materially to the costs of the process and generally nullifying any savings made by the substitute mills.

DESCRIPTION OF THE PRIOR ART

Several references disclose broadly that additives can be added during the impregnation step to avoid the ball milling step. However, in practice this is unsuccessful, and molded products of uniform coloration and appearance cannot be obtained.

Gerko in U.S. Pat. 3,026,277, issued Mar. 20, 1962, discloses a process whereby all of the additives can be added during the impregnation step if a non-ionic surface active agent is also added. The presence of the surface active agent is said to promote uniform dispersion of the pigments and other additives such that ball milling is no longer required and the mixer product is dried, densified and granulated directly in conventional manner. However, once the catalyst or accelerator has been added to an amino aldehyde resin, the mixture becomes extremely sensitive to heat and very careful control of the drying operation is necessary to prevent premature curing of any of the resin to the thermoset stage, thereby interfering with proper flow properties of the resin as it is molded.

SUMMARY OF THE INVENTION

We have unexpectedly found that batch ball milling can be eliminated in favor of a continuous milling step by adding the pigments during the impregnation step, drying the uncatalyzed resin to form pigmented popcorn, thereafter adding the required conventional catalysts, stabilizers and mold lubricants in a continuous mill. This process effects large economies of operation with no decrease in the uniformity of color or appearance of molded articles prepared by this process. When the pigments are added along with other ingredients to the popcorn in the continuous mill, however, the resultant molding composition will not produce molded articles having acceptable uniformity of color or appearance.

According to our preferred process, the continuous mill is a continuous ball mill, hereinafter called a tube mill, which we have found will grind pigmented popcorn to a fine powder while at the same time it will adequately disperse other ingredients including lubricants, catalysts, stabilizers and the like to give a commercially acceptable product. The continuous tube mill performs the same function as the batch ball mill hereinabove described but is arranged to allow continuous feeding and discharge of the product. Other continuous grinding devices such as attrition mills can also be utilized to accomplish the same purpose.

DETAILED DESCRIPTION OF THE INVENTION

We prepare amino aldehyde molding compositions of excellent quality by adding a conventionally prepared amino aldehyde condensate aqueous syrup and the desired pigments to a filler in a standard mixer wherein the filler is impregnated with the amino aldehyde resin and the pigments are dispersed throughout the mixture; drying the impregnated pigmented filler product to a free moisture content of from 0.6% up to 2% by weight; cutting the dried product into popcorn; grinding the popcorn along with stabilizers, catalysts and lubricants in a continuous mill. If desired, the mill product is densified and granulated in conventional manner.

The amino formaldehyde resins that can be prepared according to the invention include resins of amino compounds such as urea, melamine and guanamine, with an aldehyde such as formaldehyde. These are the principal resins in commercial production although other amino compounds are also known such as thiourea, methylurea, acetylurea, benzoylurea, phenylthiourea, allylurea, ethylidine urea, guanidine, benzoguanamine aminotriazines and the like. The usual source of aldehyde is a 37% to 50% aqueous solution of formaldehyde known as Formalin, although other aldehydes can be substituted in whole or in part such as compounds which produce formaldehyde including paraformaldehyde or hexamethylenetetramine, acetaldehyde, furfurol, benzaldehyde, propionaldehyde, crotonaldehyde, butyraldehyde, acrolein and the like.

The amine and aldehyde are reacted together in aqueous solution until the desired degree of condensation is obtained. Urea formaldehyde resins are reacted in mol ratios of from 1.2 to 1.8:1, preferably 1.35 to 1.6:1, of formaldehyde to urea. Melamine resins are generally prepared at a mol ratio of melamine to aldehyde of 1.2 to 3.0:1. During the reaction, the pH is maintained at a predetermined level by addition of various acids or bases. Urea formaldehyde resins are reacted at a pH of 5.5–8.0, whereas guanamine aldehyde and melamine resins are maintained at a pH of 7.5–9.0. Suitable pH regulators include bases such as ammonia, sodium hydroxide, sodium carbonate, calcium hydroxide, ethanolamine and the like, and acids such as sulfuric acid, hydrochloric acid, phosphoric acid, formic acid, acetic acid, lactic acid and the like.

When the reaction is complete, the solution is cooled to stop the reaction. The solution is then charged to a suitable mixer along with the filler and the desired pigments.

A filler forms an essential part of the present molding compositions since it imparts strength to the final molded articles. The filler is usually of the fibrous type and can be alpha cellulose, regenerated cellulose, cotton, linen, glass fibers, nylon, wool, silk, acrylonitrile fibers, asbestos fibers, and the like and can include other fillers such as wood flour, silica, talc and the like. The filler generally constitutes from 25 to 35% by weight, preferably 27–32% by weight of the final molding composition. Alpha cellulose is the preferred filler. Since it is usually available in roll or sheet form, it is cut or shred into cotton-like material before adding to the mixer.

Any of the common inorganic or organic pigments can be employed, including cadmium yellows, cadmium reds, iron oxides, chrome yellows, chrome greens, carbon and mineral blacks, phthalocyanide greens and blues, gold, silica, aluminum and copper powders and the like, as well as dyestuffs such as alizarine red, Prussion blue, auramin, naphthol, malachite green and the like. Opacifiers such as titanium oxide, zinc oxide or zinc sulfide and the like are also generally added with the pigment. Pigments and dyestuffs are generally available in the form of fine powders and thus no particular pre-treatment of the pigment is required prior to adding to the mixer. In order to facilitate measurement of the required pigments and to provide improved color control from one batch to another, a master batch concentrate can be prepared with amino aldehyde resin from a previous run. However, simple mixing of the filler, resin solution and pigment during impregnation of the filler is all that is required to obtain a uniform dispersion of the pigment in the impregnation process.

The pigmented impregnated filler is then dried to remove excess water to a free moisture content of from 0.6% up to 2% by weight. The mixer product is deposited evenly on a continuous belt in an oven. Preconditioned hot air is passed through the moving bed to remove the excess water but without allowing the drying resin to overcondense. When the water content is reduced to the required level, the product is a friable solid which is then fed through breakers and a cutter to form the pigmented popcorn.

The pigmented popcorn is then charged to a continuous mill along with other required additives, including accelerators or catalysts, mold lubricants and stabilizer.

Accelerators or catalysts are well known and conventional and include zinc sulfate, ammonium chloride, ammonium boron trifluoride, ammonium silicon tetrafluoride, phthalic anhydride, tetrachlorophthalic anhydride, hexachlorophthalic anhydride and the like. The catalyst is added in amounts of from 0.01 to 2% by weight of the molding composition, preferably in amounts of from 0.03–0.5% by weight.

Lubricants or mold release agents suitable in the present process are also conventional and include zinc stearate, glycerol monostearate, carnauba wax, calcium stearate, zinc palmitate, montan wax and the like. Generally from 0.01% to 5.0% of the lubricant by weight of the molding composition can be employed and the preferred amounts are from 0.3 to 2% by weight.

Hexamethylenetetramine is the compound usually employed as stabilizer to prevent premature cure of the resin. This stabilizer can be employed in amounts of from 0.05 to 5.0% by weight of the molding composition, preferably 0.1 to 1.0% by weight. A stabilizer is required for use for urea formaldehyde molding compositions but can be omitted in melamine molding compositions.

The additives and popcorn are continuously fed or metered to one end of a continuous mill such as a tube mill or attrition mill, wherein the popcorn is reduced in size to about 100 to 200 mesh and the other ingredients are uniformly dispersed in the molding composition. Tube mills are preferably employed in this step since they are available in a convenient size for commercial operation and provide both fine grinding and mixing during rotation of the mill. However, other mills which can both finely grind and mix, such as attriction mills, can also be employed.

The product obtained from the milling step can be employed as is, but generally is further compacted to reduce the density and then granulated in form suitable for shipment to the molder. These last steps are conventional and known to those skilled in the art.

The molding compositions prepared according to the present process are uniformly pigmented and can be molded to form articles having excellent appearance at normal molding speeds. They are fully equivalent in every respect to molding compositions prepared according to the conventional ball milling process. In addition, it was unexpectedly found that the gassing characteristics, that is, the tendency to form gas during molding which causes voids and surface imperfections in the finished molded article, of various molding compositions prepared by the present process are improved over conventionally prepared material.

The invention will be further illustrated by the following examples, but it is to be understood that the invention is not meant to be limited to the details described therein. All parts and percentages are by weight.

EXAMPLE 1

A pigment master batch was prepared by ball milling 98 parts of unpigmented urea formaldehyde popcorn having a mol ratio of 1.5:1 and a filler content (alpha cellulose) of 27% with 1.059 parts of Violet Toner No. 5, 0.079 part of red pigment, 0.685 part of yellow pigment and 0.177 part of blue pigment. 0.2 part of zinc stearate lubricant was also added. The mixture was ground for one hour in a conventional ball mill.

A conventional resinous condensate of 50% aqueous formaldehyde and urea having a mol ratio of 1.5:1 was prepared and 1160 lbs. charged to a shredder mixer with 321 lbs. of chopped alpha cellulose pulp. The mixture was stirred for five minutes when 20% aqueous lactic acid was added as required until the pH of the mixture was 6.4±0.1. The mixture was stirred for two minutes after each addition of acid. 228.765 grams of pigment concentrate prepared as above and 2565.4 grams of titanium dioxide were added and the mixture stirred five minutes longer. Total mixing time was 20 minutes.

The resultant pigmented resin-filler mixture was dried in a conventional belt type dryer to a water content of from 0.6% up to 2% and passed through a breaker and cutter wherein the particle size was reduced by passing through a 5/32" screen. The resultant 1010 lbs. of pigmented popcorn was fed at a rate of about 1000 lbs./hr. to a tube mill concurrently with tetrachlorophthalic anhydride, metered so as to comprise 0.035% of the final product, hexamethylenetetramine, metered so as to comprise 0.1% of the final product, and zinc stearate, metered so as to comprise 0.6% of the final product. The average time of the composition in the tube mill was about one hour.

The molding composition was then densified to compact the material, cooled and granulated in conventional manner.

EXAMPLE 2

The procedure of Example 1 was followed except that the molding composition contained 32% alpha cellulose, 0.15% tetrachlorophthalic anhydride and 0.1% zinc stearate.

EXAMPLE 3

The procedure of Example 1 was followed except that the molding composition contained 27% alpha cellulose, 0.2% tetrachlorophthalic anhydride and 0.1% zinc stearate. In this composition the mol ratio of urea to formaldehyde was 1.35:1.

EXAMPLE 4

The procedure of Example 2 was followed except that the final molding composition contained 0.125% tetrachlorophthalic anhydride.

EXAMPLE 5

The procedure of Example 3 was followed except that the final molding composition contained 0.15% tetrachlorophthalic anhydride.

EXAMPLE 6

A pigment master batch was prepared by ball milling 98 parts of unpigmented melamine formaldehyde popcorn having a mol ratio of formaldehyde to melamine of 2.1:1 and a filler content (alpha cellulose) of 28% with 0.5 part of zinc stearate, 1.21 parts of Violet Toner #5, 0.688 part of blue pigment, and 0.104 part of yellow pigment. The mixture was ground in a conventional ball mill for four hours.

A conventional resinous condensate solution of formaldehyde and melamine having a mol ratio of formaldehyde melamine of 2.1:1 and water content of 33.5% was prepared and 991 lbs. charged to a shredder mixer with 234 lbs. of chopped alpha cellulose pulp. When the pulp addition was complete, 1097.5 grams of the pigment concentrate prepared as above and 1404.8 grams of titanium dioxide were added and the mixture stirred for an additional ten minutes. Total mixing time was 25 minutes.

The resultant pigmented resin-filler mixture was dried as in Example 1 to a water content of 0.8 to 2.0%, passed through a breaker and cutter wherein the particle size was reduced by passing through a 3/8" screen. The resultant 878 lbs. of pigmented popcorn was fed to an attrition mill at a rate of about 1000 lbs./hr. concurrently with zinc stearate, metered so as to comprise 0.75% of the final product and phthalic anhydride, metered so as to comprise 0.20% of the final product.

The molding composition was then densified to compact the material, cooled and granulated in conventional manner.

The composition as prepared above was molded to form plates having excellent color uniformity and surface appearance.

EXAMPLE 7

Samples of the materials prepared above were test molded in a Lauterbach Rotary Press at 338–344° F. and compared to samples of the same composition prepared according to the conventional ball milling process wherein the pigments and other ingredients are added to the popcorn in the ball mill. The moldings prepared at different speeds of from 24 to 63 moldings per minute were equivalent in appearance, molding rate and density. Improved gassing characteristics were noted for the moldings prepared according to the process of the present invention. These were determined according to a point system as given below:

POINT SYSTEM

10—No defects
9—Occasional small-medium gas pockets
8—Frequent small-medium gas pockets
7—Occasional small-medium gas blisters
6—Frequent small-medium gas blisters
5—Occasional medium-large gas blisters
4—Frequent medium-large gas blisters
3—Tendency to overcure or undercure—cracks and large blisters
2—Overcure—burns, cracks, blisters, discoloration
1—Undercure—blisters and softness The data is given below at various molding speeds:

| Composition | Milling process | Moldings per minute | | | | | | | |
|---|---|---|---|---|---|---|---|---|---|
| | | 24 | 27 | 31½ | 35 | 40 | 44½ | 50 | 57 | 63 |
| Example 2 | Ball Mill | 7 | 8 | 7 | 6 | 6 | 6 | 6 | 1 | 1 |
| | Tube Mill | 8 | 8 | 8 | 8 | 8 | 8 | 8 | 8 | 8 |
| Example 3 | Ball Mill | 2 | 6 | 6 | 7 | 7 | 7 | 1 | 1 | 1 |
| | Tube Mill | 5 | 8 | 8 | 8 | 8 | 8 | 8 | 5 | 8 |
| Example 4 | Ball Mill | 8 | 8 | 8 | 8 | 8 | 8 | 8 | 1 | 1 |
| | Tube Mill | 8 | 9 | 9 | 10 | 10 | 10 | 9 | 5 | 1 |
| Example 5 | Ball Mill | 2 | 2 | 2 | 5 | 5 | 5 | 5 | 5 | 5 |
| | Tube Mill | 2 | 2 | 2 | 8 | 8 | 8 | 10 | 1 | 1 |

We claim:
1. A process for preparing an amino aldehyde molding composition which comprises
    (1) mixing an amino aldehde condensate resin with a filler and pigment to form a homogeneous mixture,
    (2) drying the pigmented filler resin to a moisture content of from 0.6% up to 2% by weight free moisture to form a friable solid,
    (3) cutting the dried solid to form popcorn, and
    (4) grinding the popcorn in a continuous mill along with required additives including stabilizer, catalyst and mold lubricant to form a molding composition.
2. A process according to claim 1 wherein the amino aldehyde condensate is an aqueous solution prepared from urea and formaldehyde in a mol ratio of from 1.2:1 to 1.8:1 of formaldehyde to urea.
3. A process according to claim 1 wherein the amino aldehyde condensate is an aqueous solution prepared from melamine and formaldehyde in a mol ratio of from 1.2:1 to 3.0:1 of melamine to formaldehyde.
4. A process according to claim 1 wherein the filler is alpha cellulose.
5. A process according to claim 1 wherein the catalyst is added in an amount of from 0.01 to 2% by weight.
6. A process according to claim 1 wherein the mold lubricant is added in an amount of from 0.01 to 5.0% by weight.

7. A process accordingly to claim 1 wherein the stabilizer is added in an amount of from 0.05% to 5.0% by weight.

8. A process according to claim 1 wherein the filler is added in an amount of from 25 to 35% by weight.

9. A process according to claim 1 wherein the ground molding composition is densified and granulated.

10. A process for preparing a urea formaldehyde molding composition which comprises
   (1) mixing an aqueous urea formaldehyde condensate reacted in a mol ratio of from 1.2:1 to 1.8:1 of formaldehyde to urea with from 25 to 35% by weight of alpha cellulose filler and pigment to form a homogeneous mixture,
   (2) drying the pigment filled resin to a moisture content of from 0.6% up to 2% by weight free moisture to form a friable solid,
   (3) cutting the dried solid to form popcorn,
   (4) grinding the popcorn in a continuous mill along with from 0.01 to 2% by weight of a catalyst, from 0.01 to 5.0% by weight of a mold lubricant, and from 0.05 to 5.0% by weight of a stabilizer,
   (5) densifying the product from the continuous mill and
   (6) granulating the densified product.

11. A process according to claim 10 wherein the formaldehyde to urea mol ratio is from 1.35:1 to 1.6:1.

12. A process according to claim 10 wherein from 27 to 32% by weight of filler is added.

13. A process according to claim 10 wherein from 0.03 to 0.5% by weight of catalyst is added.

14. A process according to claim 10 wherein from 0.3 to 2% by weight of mold lubricant is added.

15. A process according to claim 10 wherein the stabilizer is hexamethylenetetramine added in an amount of from 0.1 to 1.0% by weight.

16. A process according to claim 10 wherein the continuous mill is a tube mill.

17. A process according to claim 10 wherein the continuous mill is an attrition mill.

18. A process for preparing a melamine form molding composition which comprises
   (1) mixing an aqueous melamine condensate reacted in a mol ratio of from 1.2:1 to 3:1 of melamine to formaldehyde with from 25 to 35% by weight of alpha cellulose filler and pigment to form a homogeneous mixture,
   (2) drying the pigmented filled resin to a moisture content of from 0.8% up to 2% by weight free moisture to form a friable solid,
   (3) cutting the dried solid to form popcorn,
   (4) grinding the popcorn in a continuous mill along with from 0.01 to 2.0% by weight of a catalyst and from 0.01 to 5.0% by weight of a mold lubricant,
   (5) densifying the product from the continuous mill and
   (6) granulating the densified product.

19. A process according to claim 18 wherein hexamethylenetetramine is added in an amount of from 0.05% to 5.0% by weight.

20. A process according to claim 18 wherein the continuous mill is a tube mill.

21. A process according to claim 18 wherein the continuous mill is an attrition mill.

References Cited

UNITED STATES PATENTS

| | | | |
|---|---|---|---|
| 2,364,721 | 12/1944 | Kassay et al. | 260—9 |
| 2,841,565 | 7/1958 | Bornstein | 260—17.3 |
| 3,007,885 | 11/1961 | Oldham et al. | 260—17.3 |
| 3,376,239 | 4/1968 | Pfeiffer | 260—17.3 |
| 3,026,277 | 3/1962 | Gerko | 260—17.3 |

FOREIGN PATENTS

| | | | |
|---|---|---|---|
| 108,518 | 12/1958 | Pakistan | 260—17.3 |
| 987,655 | 3/1965 | Great Britain | 260—39 |

HAROLD D. ANDERSON, Primary Examiner

E. WOODBERRY, Assistant Examiner